(12) United States Patent
Arshad et al.

(10) Patent No.: US 7,873,455 B2
(45) Date of Patent: Jan. 18, 2011

(54) WORK VEHICLE ACCESS MONITORING AND CONTROL SYSTEM

(75) Inventors: M. Javaid Arshad, Plainfield, IL (US); Zakaria I. Saleh, Irbid (JO); Prasenjit Adhikari, Kalamazoo, MI (US); Michael A. McSweeney, Lemont, IL (US)

(73) Assignee: CNH America LLC, New Holland, PA (US)

( * ) Notice: Subject to any disclaimer, the term of this patent is extended or adjusted under 35 U.S.C. 154(b) by 1150 days.

(21) Appl. No.: 11/534,922

(22) Filed: Sep. 25, 2006

(65) Prior Publication Data
US 2008/0077299 A1    Mar. 27, 2008

(51) Int. Cl.
*B60R 25/04* (2006.01)
(52) U.S. Cl. .............. 701/50; 701/207; 340/426.1
(58) Field of Classification Search .......... 701/50, 701/207; 342/357.17; 340/426, 426.11, 340/426.12, 425.5, 988, 989
See application file for complete search history.

(56) References Cited

U.S. PATENT DOCUMENTS

| | | | | |
|---|---|---|---|---|
| 5,532,690 | A * | 7/1996 | Hertel | 340/989 |
| 6,313,791 | B1 * | 11/2001 | Klanke | 342/357.17 |
| 6,457,129 | B2 * | 9/2002 | O'Mahony | 726/4 |
| 6,718,235 | B1 * | 4/2004 | Borugian | 701/1 |
| 7,119,696 | B2 * | 10/2006 | Borugian | 340/576 |
| 2006/0161320 | A1 * | 7/2006 | Cahoon | 701/36 |
| 2006/0206261 | A1 * | 9/2006 | Altaf et al. | 701/209 |
| 2006/0271263 | A1 * | 11/2006 | Self et al. | 701/50 |

* cited by examiner

*Primary Examiner*—Thomas G Black
*Assistant Examiner*—Ce Li
(74) *Attorney, Agent, or Firm*—Patrick M. Sheldrake; Michael G. Harms

(57) ABSTRACT

An access control system for a work vehicle that has an engine and a location is provided, the system including location sensor that indicates the vehicle's location and an electronic control unit coupled to the sensor that receives the location signal and selectively disables the engine based upon the vehicle's position outside job site boundary's or based upon the time of operation at a plurality of job sites, each job site having its own time of operation.

3 Claims, 3 Drawing Sheets

WORK VEHICLE ACCESS MONITORING AND CONTROL SYSTEM

FIELD OF THE INVENTION

The invention relates generally to systems for monitoring and controlling work vehicles.

BACKGROUND OF THE INVENTION

Computer-based fleet management systems permit operators of large fleets, such as construction and agricultural vehicles, taxicabs, rental cars, rental trucks, and work vehicles, to monitor the location of, and control access to, those vehicles.

Access to the vehicles is typically controlled using some combination of vehicle location, typically provided by the GPS receiver, and a coded operator input device that can be manipulated to communicate with the computer controlling the system. An operator is typically provided with a key or other pass card that gives him full and complete access to the vehicle over whatever range he wishes to drive it. The operator either has complete access and control, or none. Such systems, however, do not provide the flexibility needed by those operating vehicles in the construction business.

U.S. Pat. No. 5,532,690, for example, discloses a basic geofencing system in which an engine kill switch operates to shutdown the vehicle engine when it leaves a predetermined area. One problem with this arrangement is that the vehicle, when shutdown, is disabled for all further movement. For work vehicles, a sudden irremediable disabling is a problem. For example, the vehicles can block paths or roads. They can prevent the delivery of other materials. If they are disabled from all movement, they may prevent access by other vehicles, and therefore prevent other work from being done at the work site.

U.S. Pat. No. 6,249,215, describes a system that provides for gradual reduction in vehicle power when driven outside a predetermined region, but shuts down the vehicle only in predetermined areas. As the vehicle returns to the original area, the power is gradually restored. The system provides for "safe" shutdown in which the vehicle engine is shut down only when it travels to a "safe" shutdown site, such as a gas station. Nothing prevents the vehicle from being driven indefinitely, albeit at a reduced power level.

US patent publication 2003/60938 discloses a vehicle geofencing system. The system includes an electronic controller located inside a vehicle that dynamically changes the boundaries of its geofence when commanded by a central computer. The system, however, does not control access to the vehicle, it only controls the frequency with which the vehicle reports to a home base.

Similarly, US patent publication 2002/77750 is directed to a system for monitoring the operation of concrete mixing trucks as they travel to and from various job sites. As the vehicles travel, they cross various boundaries and transmit messages to a home base. The system does not disable the vehicle when boundaries are crossed.

U.S. Pat. No. 6,204,772 discloses a system for remotely configuring a work vehicle to transmit status information to a remote computer, such as whether it is operating in a particular region. The system does not disable the vehicle.

None of the systems described in these references are suited to controlling the operation of work vehicles such as those used on job sites.

What is needed is an access control system for construction work vehicles that controls and monitors the operation of the vehicles in the typical construction environment, and that will accommodate multiple job sites. What is also needed is a theft control system for a work vehicle that shuts the vehicle engine down whenever it travels outside the boundaries of one of the job sites. What is also needed is a theft control system that permits the operator to restart the engine after a short interval. What is also needed is a system that prevents the vehicle from traveling between job sites. What is also needed is an elapsed time recording system for a work vehicle that monitors the time spent at each job site, both the vehicle's actual presence at each job site and the vehicle's operating time at each job site. It is an object of this invention to provide such a system and method in which these benefits are provided by at least one mode of operation.

SUMMARY OF THE INVENTION

In accordance with a first aspect of the invention, an access control system for a work vehicle including an engine is provided, including a location sensor on the vehicle configured to provide a location signal indicative of the vehicle's location; an electronic control unit coupled to the location sensor to receive the location signal, the control unit further including an electronic memory configured to store a plurality of non-contiguous job sites, wherein the control unit is configured to permit operation of the vehicle within the non-contiguous job sites and to disable the vehicle when the vehicle leaves the non-contiguous job sites.

The electronic control unit may be configured to shut down the engine when the vehicle leaves the job sites. The electronic control unit may be configurable to prevent the vehicle from being driven from one of the plurality of job sites to another of the plurality of job sites. The electronic memory may store a boundary for each of the plurality of non-contiguous job sites.

In accordance with a second aspect of the invention, a theft protection system for a work vehicle including an engine is provided, including a location sensor on the vehicle configured to provide a location signal indicative of the vehicle's location; and an electronic control unit coupled to the location sensor to receive the location signal, the control unit further including an electronic memory configured to store boundaries of at least one job site, wherein the control unit is configured to shut down the vehicle engine when it leaves the boundaries, and to permit the vehicle engine to be restarted only after a predetermined interval of time.

The electronic control unit may be configured to permit the engine to run for only a predetermined period of time after being restarted. The electronic control unit may be configured to permit the engine to the restarted a predetermined number of times. The electronic control unit may be configured to prevent restarts after having been restarted the predetermined number of times. The electronic control unit may be configured to permit the engine to continue running upon restart for as long as it is steered back toward the boundaries, and to shut down the engine after restart if it turns away from the boundaries.

In accordance with a third aspect of the invention, an elapsed time recording system for a work vehicle including an engine is provided, including a location sensor on the vehicle configured to provide a location signal indicative of the vehicle's location; and an electronic control unit coupled to the location sensor to receive the location signal, the control unit further including an electronic memory configured to store the boundaries of a first job site and a first timing counter associated with the first job site, and to store the boundaries of the second job site and a second timing counter associated with the second job site.

The location sensor may include a GPS receiver. The electronic control unit may store in the first timing counter a value indicative of the amount of time the vehicle was located at the first job site, and wherein the electronic control unit may store in the second timing counter a value indicative of the amount of time the vehicle was located at the second job site. The electronic control unit may store in the first timing counter a value indicative of the vehicle's running time at the first job site, and wherein the electronic control unit may store in the second timing counter a value indicative of the vehicle's running time at the second job site. The electronic control unit may be configured to receive a definition of an additional job site from one circuit selected from a group including a long-range wireless communications circuit, a short-range wireless communications circuit, and a wired computer communications circuit. The long-range wireless communications circuit may be a circuit selected from a group including a cellular telephone and a satellite telephone. The short-range wireless communications circuit may be a circuit selected from a group including a Bluetooth circuit and an 802.11 circuit.

In accordance with a fourth aspect of the invention, an access control system for a work vehicle including an engine is provided, the system including means for providing a location signal indicative of the vehicle's location; and means coupled to the location sensor for receiving the location signal, the receiving means further including electronic means for storing a plurality of non-contiguous job sites, and further including means for permitting the vehicle to operate within the non-contiguous job sites and means for disabling the vehicle when the vehicle leaves the non-contiguous job sites.

The means for receiving may include means for shutting down the engine when the vehicle leaves the job sites. The means for receiving may include means for preventing the vehicle from being driven from one of the plurality of job sites to another of the plurality of job sites. The means for storing may be configured to store a boundary for each of the plurality of non-contiguous job sites. The system further includes means for downloading a job site definition. The means for downloading may include one circuit selected from the group including a long-range wireless communications circuit, a short-range wireless communications circuit, and a wired computer communications circuit.

DETAILED DESCRIPTION OF THE PREFERRED EMBODIMENTS

Figure 1:
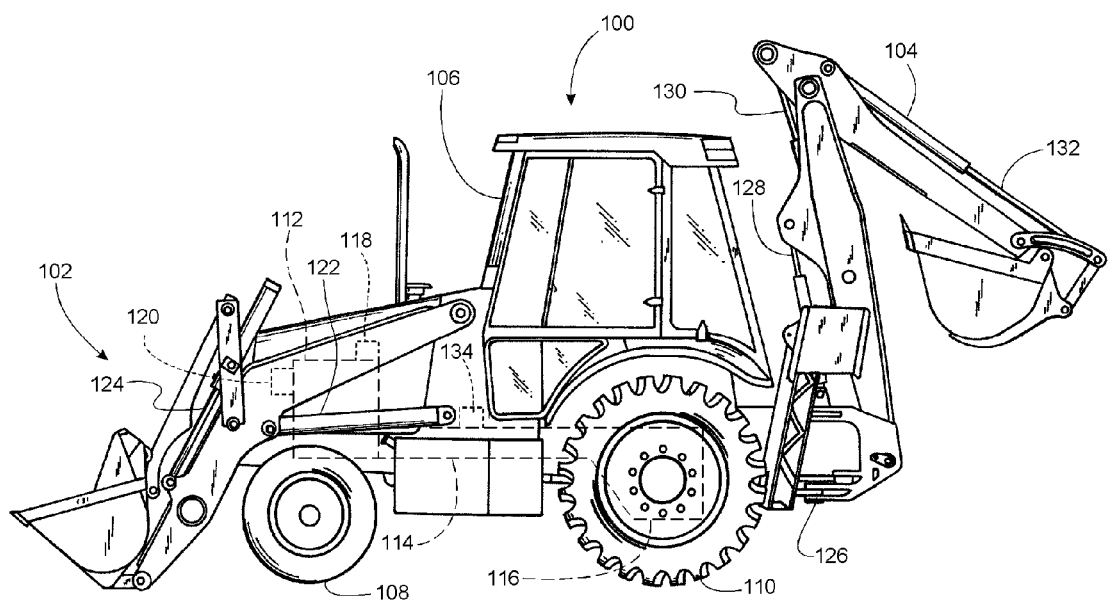
FIG. 1 is a side view of a construction work vehicle, shown here as a loader-backhoe, that has a vehicle control system.

Referring to FIG. 1, a work vehicle, here shown as a loader-backhoe 100, includes a loader attachment 102, a backhoe attachment 104 and a tractor 106. The loader attachment 102 and backhoe attachment 104 are pivotally coupled to tractor 106. Tractor 106 is supported on front wheels 108 and rear wheels 110 for movement over the ground.

Vehicle 100 is configured for construction work. Both the loader attachment 102 and the backhoe attachment 104 coupled to and supported by tractor 106 are configured to engage the ground, permitting the vehicle to dig foundations, trench the earth for cables, rip up concrete, transport sand, dirt, and gravel, and carry construction materials around on a job site. It is this configuration which makes the loader-backhoe particularly suited to working at construction sites. It should be understood that the terms "construction vehicle", "work vehicle" or "construction work vehicle" are not limited to loader-backhoes. A variety of other vehicles including, for example, wheel-loaders, skid steer loaders trenchers bulldozers and graders among others are also construction work vehicles.

Tractor 106 includes an engine 112 that drives the vehicle over the ground and provides power for the hydraulic cylinders that move the loader and the backhoe. Engine 112 is coupled to a transmission 114, that in turn drives the rear wheels through differential 116. Engine 112 is controlled by an electronic governor 118, which includes an ignition circuit (when engine 112 is a gas engine) or an injector rack controller (when engine 112 is a diesel engine). Electronic governor 118 is capable of regulating the speed of engine 112 and of turning engine 112 on and off.

Tractor 106 includes a hydraulic pump 120 that is coupled to engine 112 and is driven thereby. Hydraulic pump 120 provides hydraulic fluid to cylinders, including loader arm lift cylinders 122 and loader bucket cylinders 124 of loader attachment 102, as well as boom swing cylinders 126, boom cylinder 128, dipper cylinder 130, and backhoe bucket cylinder 132 of backhoe attachment 104. These cylinders move the loader bucket and the backhoe bucket permitting them to engage the ground. When engine 112 is turned off, the backhoe 102 and loader 104 attachments are disabled. When engine 112 is turned on, the backhoe and the loader attachments 102, 104 are enabled.

Tractor 106 also includes a vehicle access control system 134 coupled to the engine for (1) determining the vehicle's location, (2) disabling the engine (e.g. turning it on and off) based upon the vehicle's location, and (3) responding to signals provided by the engine (e.g. by governor 118) that the engine is running; and (4) logging engine hours.

Figure 2:
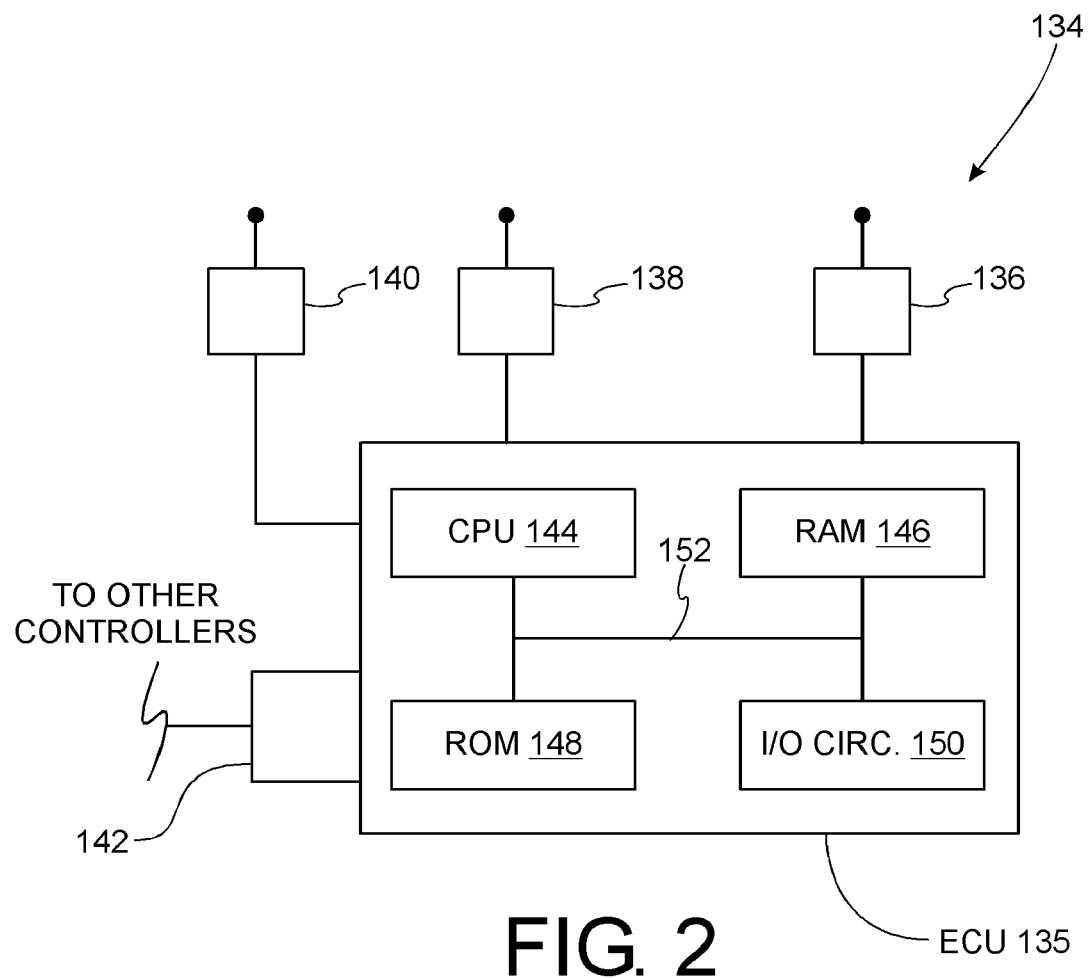
FIG. 2 is a schematic diagram of the vehicle access control system of the vehicle of FIG. 1.

FIG. 2 illustrates vehicle access control system 134 in more detail. System 134 includes (1) an electronic control unit or ECU 135, (2) a location sensor, here shown as satellite navigation receiver 136, that is coupled to ECU 135, (3) a long-range wireless communications circuit 138 coupled to ECU 135, (4) a short-range wireless communications circuit 140 coupled to ECU 135, and (5) a computer communications circuit 142 for communicating with other ECUs or controllers on the vehicle as well as digital computers that are brought to the vehicle and connected to circuit 142.

ECU 135 is a digital microprocessor-based control unit, whose functioning controls the operation of the other components 136, 138, 140, 142. In the preferred embodiment, shown here, a single ECU is coupled to all of the communications circuits and the location sensor.

ECU 135 may be coupled to other circuits and sensors in addition to the circuits shown here. It may also be programmed to perform additional functions not described herein. In an alternative configuration, several ECU's may be interconnected to collectively perform the functions described herein. In this alternative configuration, each ECU may be coupled to one of the communications circuits and sensor circuit and coordinate its activities with the other ECU's over a network that interconnects these ECU's.

Location sensor 136 provides a signal indicating the location of the vehicle in at least two dimensions (e.g. latitude and longitude, or other similar coordinate system), and thus whether the sensor (and by extension the, the vehicle) is inside or outside of to dimensional job site boundaries. Alternatively, sensor 136 can provide a signal indicating the location of the work vehicle in three dimensions. In its preferred embodiment, sensor 136 is responsive to navigation signals provided by satellites and generates a signal indicating the location of sensor 136 (and hence of vehicle 100). This navigation signal is transmitted to ECU 135, which is configured to determine the location of the vehicle based upon the navigation signal.

Long-range wireless communications circuit 138 is configured to provide long-range wireless telecommunications. In its preferred embodiment, circuit 138 communicates with long-range wireless communication networks, such as cellular phone networks 137 or satellite phone networks 139. ECU 135 is configured to transmit location data and other data to a remote fleet management computer 141 over circuit 138.

Short-range wireless communications circuit 140 is configured to provide short-range wireless telecommunications. In its preferred embodiment, circuit 140 is configured to communicate with other digital computers located within adjacent to, or nearby the vehicle. Circuit 140 may comprise such short-range radio communication circuits as Bluetooth devices, or IEEE 802.11 devices, such as WiFi transceivers.

Computer communications circuit 142 is configured to provide short-range wired communications. In its preferred embodiment, circuit 142 communicates with digital computers or ECU's located within, adjacent to, or nearby the vehicle. Circuit 142 may comprise an Ethernet circuit, Token Ring circuit, AppleTalk circuit, RS-232 or other serial communications circuit, parallel communications circuit or other circuit for digital communications between ECU 135 and other ECU's, controllers, or digital computers that couple thereto by electrical or optical conductors.

FIG. 2 also illustrates internal details of the components of ECU 135 which include a CPU 144, random access (RAM) memory 146, non-volatile (ROM) memory 148, and an I/O circuit 150, which are coupled together by a control/data/address bus 152.

CPU 144 is a digital central processing unit whose operation is controlled by digital instructions stored in non-volatile memory 148. Nothing herein should suggest that CPU 144 performs only the functions described herein. CPU 144 may perform other functions that are not described herein. In an alternative configuration, several CPU's may be interconnected to collectively perform the functions described herein. Each CPU may have its own memory circuits and I/O circuit, or may share these circuits with other CPUs. Furthermore, the ECU 135 may have more than the one CPU, RAM, ROM and I/O circuit illustrated herein.

CPU 144 executes instructions stored in ROM memory 148. These instructions control the operation of control system 134. This operation is described below in conjunction with FIG. 3.

RAM memory 146 provides temporary storage space for variables and other computational results as system 134 operates. Memory 146 receives and stores data that CPU 144 generates as CPU 144 executes the instructions stored in non-volatile memory 148.

RAM memory 146 is preferably nonvolatile, capable of storing data even when the operational power normally provided to ECU 135 is turned off. RAM memory 146 holds many numeric values used during the operation of the vehicle. In particular, RAM 146 is configured to hold several values that ECU 135 uses to perform the functions described below. RAM 146 stores a list of job sites in which vehicle 100 is authorized to operate. RAM 146 stores the boundaries of these authorized job sites in a form that permits CPU 144 to determine whether vehicle 100 is inside or outside of the job sites' boundaries when ECU 135 given the vehicle's location by location sensor 136. Whenever vehicle 100 is authorized to operate at an additional job site, new job site boundaries are downloaded and a new job site defined by those boundaries is added to the job site list. ECU 135 is programmed to download the job site and their boundaries from remote fleet management computer 141 over circuit 138 or from a computer 143 located adjacent to vehicle 100 and configured to communicate with vehicle 100 wirelessly via circuit 140 or via a conductor coupling computer 143 and circuit 142. RAM 146 also stores, for each job site, an amount of time that vehicle 100 is authorized to operate at that job site. RAM 146 (or, alternatively, memory 148) includes memory locations in which ECU 135 records several different time values indicating, respectively, (1) the amount of time the vehicle was at the job site, (2) the amount of time the vehicle was operating, (3) the amount of time the engine was running, (4) the amount of time the vehicle was moving, and (5) the amount of time the backhoe or loader attachments were moving or otherwise being used. An signal indicating the time the engine is running is provided to ECU 135 by governor 118. An indication that the various controls are being operated (and hence of the interval over which they are operated) can be provided by switches coupled to the controls and to ECU 135 to sense their manipulation by the operator (and hence sense the use of the hydraulic elements of the vehicle). Vehicle movement can be sensed by switches in the transmission responsive to gear engagement, that are coupled to ECU 135. Alternatively vehicle movement can be determined by ECU 135 monitoring changing vehicle position indicated by position sensor 136.

I/O circuit 150 is coupled to sensor 136 and circuits 138, 140, 142 and is configured to provide the signals and data they generated to CPU 144 for the CPU for use in performing the operations described herein.

Engine Disabling when Leaving Job Sites

Figure 3:
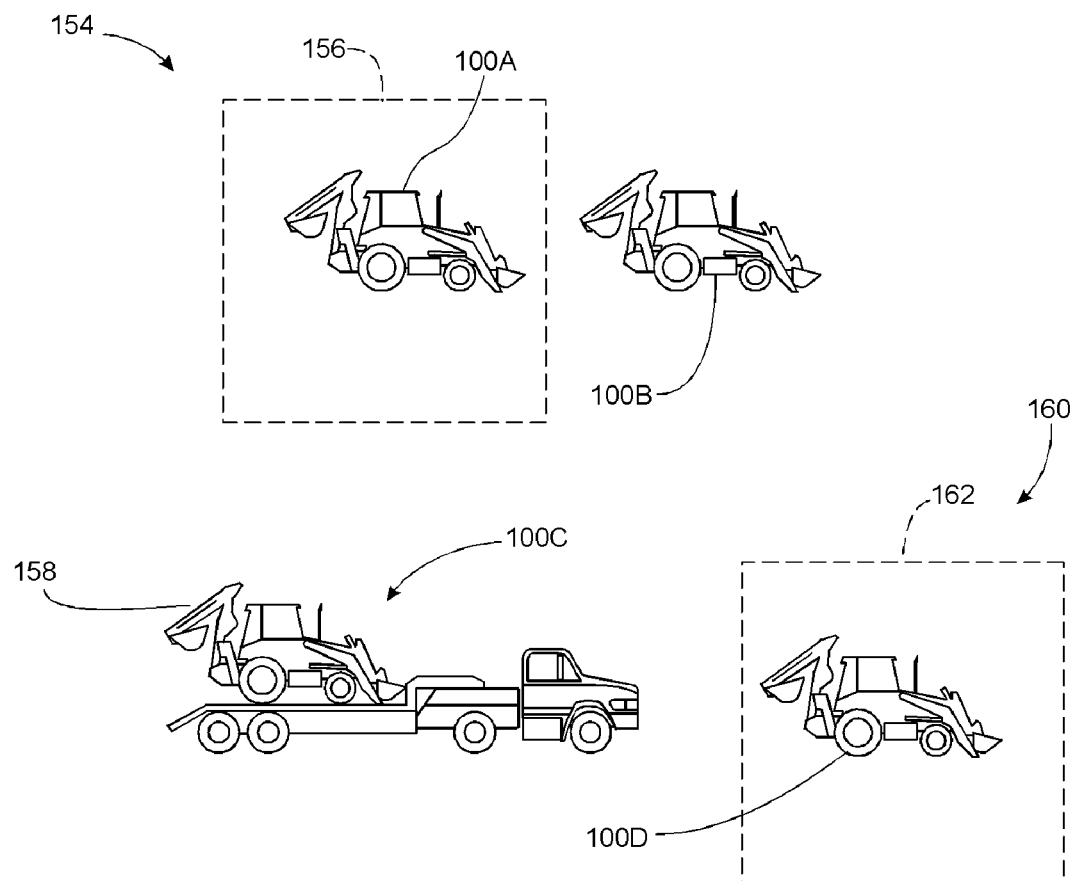
FIG. 3 is a schematic diagram showing the construction work vehicle at two job sites, showing the vehicle disabled outside of a job site, and showing the vehicle being hauled from one job site to another job site.

FIG. 3 illustrates the operation of control system 134 of vehicle 100. In FIG. 3, vehicle 100 is shown in four different locations (100A, 100B, 100C, and 100D), each location illustrating the vehicle at a different place during normal vehicle operation. The discussion below explains how control system 134 operates when vehicle 100 is located at these different locations.

When vehicle 100 is at first location 100A it is located within boundaries 156 of a first job site 154. The second location 100B shows vehicle 100 located adjacent to but outside the boundaries 156 of job site 154. The third location 100C shows vehicle 100 located on a trailer 158, which is in the process of transporting vehicle 100 from first job site 154 to a second job site 160 defined by boundaries 162. The fourth location, 100D, shows vehicle 100 located within the boundaries 162 of the second job site 160.

ECU 135 on vehicle 100 is programmed to continuously (1) determine the location of the vehicle by reading location sensor 136, receiving from it a signal indicative of the vehicle position, and (2) selectively disable the vehicle when it travels outside the boundaries of the job sites as determined by comparing the position signal with the job site boundaries in ECU memory and shutting own the engine. ECU 135 disables the vehicle by shutting down engine 112. Thus, when vehicle 100 is at location 100A within the boundaries of the first job site 154, ECU 135 permits the vehicle and the engine to operate by not disabling the engine 112.

Vehicle 100 can be driven across boundaries 156 and out of job site 154, to location 100B. When vehicle 100 is driven to this location, ECU 135 is configured to (1) determine that the current location of vehicle 100 is outside of the boundaries of job site 154, and based upon this determination (2) shut down engine 112, thereby disabling vehicle 100.

Generally speaking, in order to shut down engine 112 and disable vehicle 100, control system 134 transmits a signal to engine governor 118 (FIG. 1) signaling the governor to disable the ignition (if engine 112 is a spark ignition engine) or to reduce the rack position to zero (if engine 112 is a diesel engine). Alternatively, control system 134 can shut down engine 112 by shutting off the fuel supply (e.g. by disabling the fuel pump or closing of valve disposed in the fuel line) or shutting off the air supply (e.g. by closing a throttle plate or other air valve that controls the flow of air to engine 112. Control system 134 is configured to determine whether engine 112 is running are not. Engine governor 118 signals control system 134 that it is running over signal lines that couple the two together.

Limited Restarting to Return to Job Site

In the section above, we described how the operator may drive the vehicle outside of either of the job site boundaries 156, 162, and how when this happens, ECU 135 is configured to shut down the engine. On occasion, however, the operator may unintentionally drive the work vehicle outside of the job site boundaries. In these instances, the operator will wish to start to vehicle up and return it to the job site as soon as possible. ECU 135 is configured to permit a limited number of engine restarts and limited operation. By permitting a limited number of engine restarts, the operator is given time to drive the vehicle back into the job site, or (alternatively) to move the vehicle to a more secure location outside of the job site.

Permitting the vehicle to be restarted, even if only for a limited time, raises the possibility that a thief could repeatedly restart the vehicle 100, drive it a short distance before it is disabled, then repeat the process until the vehicle is far away. To reduce the chance of this occurring, ECU 135 is configured to prevent the vehicle's engine from being restarted for a predetermined interval of time, called a "restart delay interval". If the operator attempts to start the engine during this time interval, ECU 135 prevents the engine from starting. Only after the restart delay interval has passed will ECU 135 enable the vehicle and permit the vehicle to be restarted. The restart delay interval is preferably 30 seconds long.

Once the restart delay interval has passed, ECU 135 permits the engine 112 to be restarted by re-enabling whatever vehicle systems it had previously disabled to prevent restarting. As mentioned above, these vehicle systems preferably include rack position, air supply, fuel supply, or ignition.

ECU 135 does not permit the engine to run indefinitely once it is restarted, however. ECU 135 monitors the location of the vehicle, recognizes that it is still outside the job site, and permits the engine to run for only a second predetermined time interval called a "restart run interval". The restart run interval is preferably 30 seconds.

Having restarted a previously disabled vehicle outside the jobsite boundaries 156, 162, if the operator does not drive the vehicle back within the boundaries of the job site within the restart run interval, ECU 135 is programmed to shut down the engine again. Once ECU 135 shuts down the vehicle a second time, ECU 135 is programmed to repeat the delay process and again prevent the engine from restarting for another restart delay interval. Once the restart delay interval has passed again, the operator can again restart the vehicle and again operate it for another restart run interval.

ECU 135 is configured to repeat this engine-starting and engine-stopping process a predetermined number of times, preferably four, permitting the operator each time to return the vehicle to within the boundaries of the job site. Once this starting/stopping process has been repeated the predetermined number of times, ECU 135 is configured to totally disable engine 112.

ECU 135 maintains an internal counter in memory 146 or 148. Each time the vehicle is restarted, ECU 135 increments this counter. Before restarting the vehicle, ECU checks this counter to see whether the counter has reached a maximum number of restarts. Whenever ECU 135 determines that the counter has reached the maximum number of restarts, the ECU disables the vehicle by preventing any further restarts. Thus, ECU 135 permits only a limited and predetermined number of restarts. If the operator has not returned to within the boundaries of one of the job sites listed in ECU 135 memory before this limit is reached, the vehicle will remain disabled and outside the boundaries of the job sites.

Subsequent efforts to restart the engine, for example, by the operator using the ignition switch or other standard starting means, will not work. If the vehicle has been returned to within the job site boundaries sometime during the predetermined number of engine restarts, the vehicle will again operate as normal within the boundaries of the job site. Only after ECU 135 restarts the vehicle the predetermined number of times outside the job site boundaries before returning to the job site will the vehicle be disabled and not restart.

To enable the vehicle again after it has had its maximum restarts, ECU 135 is programmed to respond to a special reset signal transmitted to it from a computer coupled to the long-range communications circuit 138, the short-range communications circuit 140, or the wired computer communications circuit 142.

ECU 135 is programmed to receive the reset signal and responsively return to its original operating mode in which it periodically tests whether it is within one of the plurality of predetermined noncontiguous job sites.

It should be clear from this description that control system 134 is configured to prevent a work vehicle from being driven from one job site where it is enabled to operate to another distant job site where it is also enabled to operate. Any attempt to drive the vehicle between two noncontiguous job sites would cause the engine to shut down as described above. Of course, if the two job sites were immediately adjacent to each other, or touching each other, the operator would be able to drive from one job site to another.

In order to move work vehicle 100 from one job site to a distant and non-contiguous job site, the work vehicle 100 must be towed or carried. It cannot travel under its own power. Since the job sites are not joined together—i.e. not contiguous—there is no way to get from one job site to the other without the engine automatically shutting down. It is the region between the two job sites in which control system 134 shuts the engine down. This prevents vehicle 100 from traveling between job sites under its own power. A vehicle traveling on a trailer does not travel under its own power, and therefore does not need to have its engine running.

This is the situation indicated by vehicle 100 at location 100C. At location 100C, vehicle 100 is shown loaded on trailer 158 with the trailer carrying the vehicle from job site 154 to job site 160. In the preferred process, vehicle 100 is loaded on trailer 158 within the boundaries of first job site 154. Since vehicle 100 is within the confines of first job site 154 during this loading process, control system 134 permits the engine of the vehicle to operate and permits the operator to drive vehicle 100 onto trailer 158. Once vehicle 100 is on trailer 158, the operator turns off engine 112 of vehicle 100 and readies vehicle 100 for transport.

The operator can then enter the cab of the vehicle 159 that is coupled to and pulls trailer 158 and carries trailer 158 together with vehicle 100 across the boundaries 156 of first job site 154.

The operator can tow vehicle 100 on trailer 158 from first job site 154 to second job site 160 whether engine 112 of vehicle 100 is running or not. If engine 112 of vehicle 100 is indeed running when trailer 158 leaves the boundaries of the first job site, control system 134 will shut down engine 112 as described above. Since vehicle 100 is already on trailer 158, however, disabling the vehicle and shutting down engine 112 will not prevent vehicle 100 from being carried from one job site to another and from being restarted inside the new job site boundaries once it arrives.

Transportation is not limited to the two job sites illustrated in FIG. 3. Additional job sites and corresponding boundaries may be recorded in ECU 135, such as work sites, maintenance facilities, repair depots, storage lots, or other locations.

Returning to the example of FIG. 3, the operator eventually arrives at second job site 160 with trailer 158 and vehicle 100 in tow. The operator tows trailer 158 and vehicle 100 until they are within the boundaries 162 of job site 160. Once within the boundaries of the job site vehicle 100 can be started, and will run continuously. It is then driven off the trailer and operated at job site 160 to perform work.

ECU 135 is configured to determine whether vehicle 100 is at any of a plurality of job sites, and to permit operation only at those job sites. It uses the vehicle's position, which is derived from location sensor 136 and the boundaries of each of the plurality of job sites stored in the electronic memory of ECU 135 to determine where the vehicle is. When vehicle 100 is started at the second job site 160, ECU 135 senses that vehicle 100 is within the boundaries 162 of the second job site 160 and permits the operator to start and run vehicle 100. ECU 135 is configured to automatically and periodically check the location of vehicle 100 at the second job site 160 just as ECU 135 did at its first job site 154. Since both job sites are defined in the memory of control system 134 as authorized regions of operation, ECU 135 is configured to not disable vehicle 100, but to permit vehicle 100 to operate at the second job site as well.

If the operator drives vehicle 100 across the boundaries 162 of second job site 160 and outside of the job site 160, control system 134 will perform the identical functions it performed at job site 154. It will identify that vehicle 100 is no longer within the boundaries of any job site and will disable vehicle 100 by turning off engine 112.

Self-propelled travel by vehicle 100 between the two job sites is therefore prevented. A vehicle starting at a first job site cannot exit that job site and travel to a second job site, and a vehicle at the second job site cannot exit that job site and travel to the first job site. The vehicle is configured to permit operation at both of those job sites and to prevent it from being driven between the job sites.

Right of Return to Job Site

The control system 134 is configured to permit the operator to return to vehicle to a job site it inadvertently left. It does this by monitoring the location of the vehicle. As long as vehicle 100 follows a path calculated by control system 134 to return to a job site that the vehicle just departed, ECU 135 will not disable the vehicle, but will permit it to keep operating.

Referring to FIG. 3, if the work vehicle starts at location 100A inside job site 154, and is driven across boundary 156 until it is outside job site 154 at location 100B, ECU 135 will shut down the vehicle's engine. This was described above. After a predetermined time interval, the operator will be permitted to restart the vehicle, also as described above. In this alternative configuration, ECU 135 is configured to permit the vehicle to return to job site 154 from which it immediately departed without disabling the engine after a predetermined time duration as described above in the Limited Restart section.

Instead, ECU 135 determines the direction of travel of the vehicle and permits the vehicle to keep operating as long as the vehicle is traveling in a direction back toward job site 154. When the vehicle is restarted, ECU 135 begins a timer to determine whether the restart run interval has been exceeded as described above in the Limited Restart section. In the Right of Return configuration, however, as soon as ECU 135 determines that the vehicle is pointing back toward job site 154, ECU 135 stops determining whether the vehicle has exceeded the restart run interval. Instead, as long as the direction of travel is directed back toward boundary 156 and job site 154, ECU 135 will permit engine 112 to continue running. It will not shut down engine 112 after the restart run interval has expired. However, should the operator turn vehicle 100 away from boundary 156, thereby driving the vehicle in a direction that increases the distance between vehicle 100 and job site 154, ECU 135 will shut down engine 112.

Time Logging

Another feature of ECU 135 of control system 134 is its ability to keep a running total of the time the vehicle spends on site for each job site, a running total of the time the vehicle engine runs on site for each job site and a running total of the time the vehicle spends operating anywhere, and its ability to shut down vehicle 100 when any (or all) of these totals exceed an associated predetermined amount.

For example, ECU 135 is programmed to store in nonvolatile memory 148 a predetermined vehicle time limit for presence at each job site, a predetermined vehicle time limit for engine running at each job site, a predetermined vehicle time limit for vehicle movement at each job site, and a predetermined vehicle time limit for implement operation at each job site. Each job site has a corresponding set of these time limits.

ECU 135 is programmed to maintain timers for each of the three running totals in nonvolatile memory 148 and to periodically increment these timers as appropriate. When vehicle 100 is in job site 154, ECU 135 increments a presence timer, and engine running timer, a vehicle movement timer, and an implement operation timer that are associated with job site 154. Similarly, when vehicle 100 is in job site 160, ECU 135 increments a presence timer, an engine running timer, a vehicle movement timer, and an implement operation timer that are associated with job site 160.

Further, ECU 135 is programmed to respectively compare the predetermined time limits with the timers, and to disable the vehicle if any of the predetermined time limits are exceeded.

Even further, ECU 135 is configured to disable the vehicle by shutting the engine down for exceeding the time limits.

ECU 135 increments the timers based upon its current location. Whenever tractor 100 is in a particular job site, ECU 135 increments the timers associated with that job site and not the timers associated with the other job sites. ECU 135 increments the timer associated with total vehicle operating time whenever the vehicle operates, and regardless of where it is operating. Thus, there are both timers specific to operation at each individual job site and a timer associated with operation anywhere.

When the vehicle changes from one job site to another, ECU 135 is configured to sense this change in position and to switch to the timers appropriate for that job site, and to periodically update them, typically on the order of once every 10 milliseconds to once every few minutes. Unlike prior art systems in which a single timer is maintained that indicates the total operating time of the vehicle, control system 134 maintains multiple timers, each timer being associated with a different and non-contiguous area (in this case different job sites).

ECU 135 further includes a timer that includes overall engine running time, no matter where vehicle 100 is located. ECU 135 is configured to increment this timer whenever the vehicle's engine runs, no matter where the vehicle is located.

Thus the areas associated with some timers are discrete and non-contiguous (i.e. timers for different job sites), some timers overlap each other in area, but are not coextensive in area (i.e. any job site engine running timer and the overall engine running timer), some timers are coextensive in area, but not coextensive in time (i.e. the timer indicating the vehicle's presence at a job site A and the timer indicating the vehicle's engine running time at job site A).

Providing multiple operating times for several different jobsites and an overall engine running time is particularly beneficial with work vehicles, which may be authorized to work on jobs at several different job sites. Construction work vehicles are often shifted between job sites unexpectedly. Initial construction plans may anticipate that a skid steer loader or loader-backhoe (for example) is required at a job site at a particular time to do a particular task. These tasks are often estimated at a predetermined number of hours, and customers of the builder or contractor are charged accordingly. It is often undesirable for a work vehicle to be used a worksite for more than the predetermined and bargained-for period of time.

To enforce these time or use limits, control system 134 is configured to maintain a plurality of time records indicating the permitted use limits and actual use of vehicle 100 at a plurality of job sites. Using the example of FIG. 3, for example, vehicle 100 can be programmed with the permitted amount of time vehicle 100 may operate at both job sites. In this manner, the contractor or builder can keep track of the operating hours of work vehicles at two different job sites for two different clients, without having to maintain separate sets of books or rely on manually entered operator records. Further, the operator can contract with customers for a predetermined amount of time the vehicle can be used and leave the particular date and time at which that use will occur open for later adjustment.

For example, if a construction company with a backhoe agrees to dig two foundations for two different customers at two different job sites and negotiates a different number of total hours for each customer, control system 134 can be configured to keep track of these hours no matter when the hours are worked. Using the example of FIG. 3, the owner of vehicle 100 can contract to dig a foundation at job site 154 in 20 hours. The owner of vehicle 100 can also contract to dig a foundation at job site 160 in 30 hours. The boundaries of these two job sites and the hours allotted for each job can be recorded in the nonvolatile memory 148 of control system 134. With these limits programmed into control system 134, vehicle 100 can be moved to job site 154 and the operator can commence work. ECU 135 monitors location sensor 136 and increments the elapsed engine running time timer in the memory 148 of ECU 135 as the vehicle works. ECU 135 is configured to periodically compare this elapsed engine running time to the predetermined time limit of 20 hours allotted for that job which is also stored in memory 148. When vehicle 100 is worked for the agreed-upon and programmed with 20 hours, ECU 135 is configured to shut down engine 112 of vehicle 100 and prevent further work at that job site. With the work complete at job site 154, vehicle 100 can be transported from job site 154 to job site 160 on trailer 158, and can then commence work at job site 160. ECU 135, following the same logic, will monitor location sensor 136 and increment the elapsed engine running time timer in the memory 148 of ECU 135. ECU 135 is configured to periodically compare this elapsed engine running time at job site 160 to the 30 hours allotted for that job, which is also stored in memory 148. When vehicle 100 has worked for the agreed-upon and programmed 30 hours, ECU 135 will shut down engine 112 of vehicle 100.

The foregoing paragraph is just one example. The flexibility of the system, however, rests in its ability to simultaneously maintain both job site boundaries and associated timers in memory 148 and permit operation at either job site in any order, and at any time, until the predetermined allotted time for operation at each particular job site has elapsed. For example, and as is often the case at construction work sites, work may be delayed at one job site for sudden and unanticipated reasons: another contractor may not perform his preparatory work, bad weather may prevent vehicle 100 from working outside, or governmental approvals may be delayed. Whatever the reason, vehicle 100 can easily accommodate these delays by ceasing operations at one job site before its total allotted time at that job site has expired, and beginning work (or continuing work) and another job site.

As one illustrative example assume that the operator stops working after having worked only five hours at job site 154. ECU 135 has kept an ongoing record of the elapsed engine running time at job site 154, and thus stores data indicative of the time worked (five hours) as well as the total engine running time permitted at that job site (20 hours).

The operator can then load vehicle 100 onto trailer 158 and move it to job site 160, the alternative job site where vehicle 100 is also (using the example above) programmed to perform 30 hours of work. Upon arrival at job site 160, vehicle 100 can be started and will operate for up to 30 hours within the boundaries of job site 160. ECU 135, determining that vehicle 100 is within the boundaries of job site 160, will increment the timers for work performed at job site 160, and not increment the timers for work performed at job site 154. As the operator operates vehicle 100 at job site 160, ECU 135 periodically monitors location sensor 136 and determines that vehicle 100 is operating at job site 160. ECU 135 is programmed to increment the timer that indicates the elapsed operating time at job site 160. If work at job site 160 is delayed, after (for example) 10 hours of work has elapsed, the operator can load work vehicle 100 back on trailer 158 and return to job site 154. When the engine of vehicle 100 is started at job site 154, ECU 135 monitors location sensor 136, determines that vehicle 100 is back at the original job site 154, and updates the elapsed engine running time timer for job site 154. In this example, since five hours of operation have already elapsed at job site 154, control system 134 now updates the elapsed engine running time timer for job site 154 starting with the previously elapsed five hours and permits an additional 15 hours of engine running time at job site 154 until the total operating time at job site 154 is consumed, at which time ECU 135 shuts down the engine.

ECU 135 periodically compares the elapsed operating time at each job site with the predetermined operating time at that job site. When the elapsed time equals or exceeds the predetermined operating time, ECU 135 disables the vehicle 100. This disabling is done on a job-site-by job-site basis. In other words, vehicle 100 can meet the predetermined operating time limit for one job site, and ECU 135 will responsively disable the vehicle at that job site, preventing further operation at that job site. The vehicle will still be capable of operation at other job sites for which vehicle 100 has not reached its corresponding operating time limits.

When and how often vehicle 100 travels back-and-forth between job site 154 in job site 160 is at the operator's discretion. Since ECU 135 knows immediately what job site it is working at based upon what preprogrammed job site boundary it is within, based upon the signal from the location sensor, ECU 135 always knows which job site timing counter should be incremented, and whether the permitted time of operation has been exceeded.

Programming Boundaries and Operational Times

In the preferred configuration, control system 134 stores both the boundaries and the operational time associated with each boundary as well as the various timers that are incremented in the memory of ECU 135. ECU 135 is configured to store not just two job sites and job site boundaries and associated timers, as illustrated herein, but as many job sites as can be contained in the memory of ECU 135.

Maintaining all jobsite information in the memory of the vehicle's ECU permits vehicle 100 to operate independently of any centralized fleet management system—at least until the various time limits are exceeded and the vehicle is ultimately disabled. In the process described in Time Logging, above, ECU 135 determines that the vehicle is or is not within a boundary and has or has not consumed its hours at each job site by examining the location provided by location sensor 136 and comparing it with the boundaries and the permitted maximum number of hours of presence, running, or operating for that job site, which are stored in memory 148.

These boundaries and operational times can be programmed using any of (1) the long-range wireless communications circuit 138, (2) the short-range wireless communications circuit 140, and (3) the wired computer communications circuit 142. ECU 135 is programmed to communicate with another computer having the jobsite boundary and jobsite maximum time data by any one of these links.

In one configuration, the operator can bring a portable computer device 143 (FIG. 2) with a short-range wireless connection such as an 802.11x or Bluetooth transceiver in close proximity to the vehicle and can transmit the boundary and operational time data for one or more job sites directly from the handheld computer device to ECU 135 via short range circuit 140.

In another configuration, the operator, using a remote computer device 143 (FIG. 2) with a cellular phone or satellite phone connection, can dial the corresponding cellular phone or satellite phone circuit of the long-range wireless communications circuit 138 and transmit the boundary and operational time data for one or more job sites to ECU 135.

In yet another configuration, the operator can go to vehicle 100 and make a wired connection between a portable computer device 143 and wired communication circuit 142 of ECU 135. Once this connection is made, the operator can transmit the boundary and operational time data to ECU 135.

The description above is provided to illustrate particularly preferred embodiments of the invention. What is new, however, and what is protected by the claims below is not limited to the particular machines and processes described above. The invention may cover more than the particular machines and methods described above. The claims below are intended to communicate the actual scope of the invention and what is protected from infringement.

Certain modifications can be made to the machines and processes above while still falling within the scope of the claims below.

The invention claimed is:

1. An access control system for a work vehicle, the work vehicle having an engine and a location, the system comprising:

a location sensor on the vehicle configured to provide a location signal indicative of the vehicle's location; and an electronic control unit coupled to the location sensor to receive the location signal, the control unit further comprising an electronic memory configured to store boundaries of at least one job site, and further wherein the control unit is configured to shut down the vehicle engine when it leaves the boundaries and the control unit is configured to permit the vehicle engine to be restarted only after a predetermined interval of time has expired after the control unit shut down the vehicle engine for leaving the boundaries as indicated by the location sensor;

wherein the electronic control unit is configured to permit the engine to be restarted a predetermined plurality of times after being shut down for leaving the boundaries, the electronic control unit configured to prevent additional engine restarts after permitting the engine to be restarted the predetermined plurality of times while the vehicle is outside the boundaries as indicated by the location sensor;

wherein the electronic control unit is configured to have a restart delay time period between at least a first and second permitted engine restart while the vehicle is outside the boundaries preventing the engine from restarting for the second permitted engine restart until a predetermined period of time has elapsed after the engine has been shut down following the first permitted restart while the vehicle is outside the boundaries as indicated by the location sensor.

2. The system of claim 1, wherein the electronic control unit is configured to permit the engine to run for only a predetermined period of time after being restarted while the vehicle is outside the boundaries as indicated by the location sensor.

3. The system of claim 1 wherein the electronic control unit is configured to permit the engine to continue running upon restart for so long as the vehicle is outside the boundaries and traveling in a direction back toward the boundaries as indicated by the location sensor, and to shut down the engine when the vehicle is outside the boundaries and the vehicle turns away from the boundaries as indicated by the location sensor.

* * * * *